Inventor:
Hans Schulz

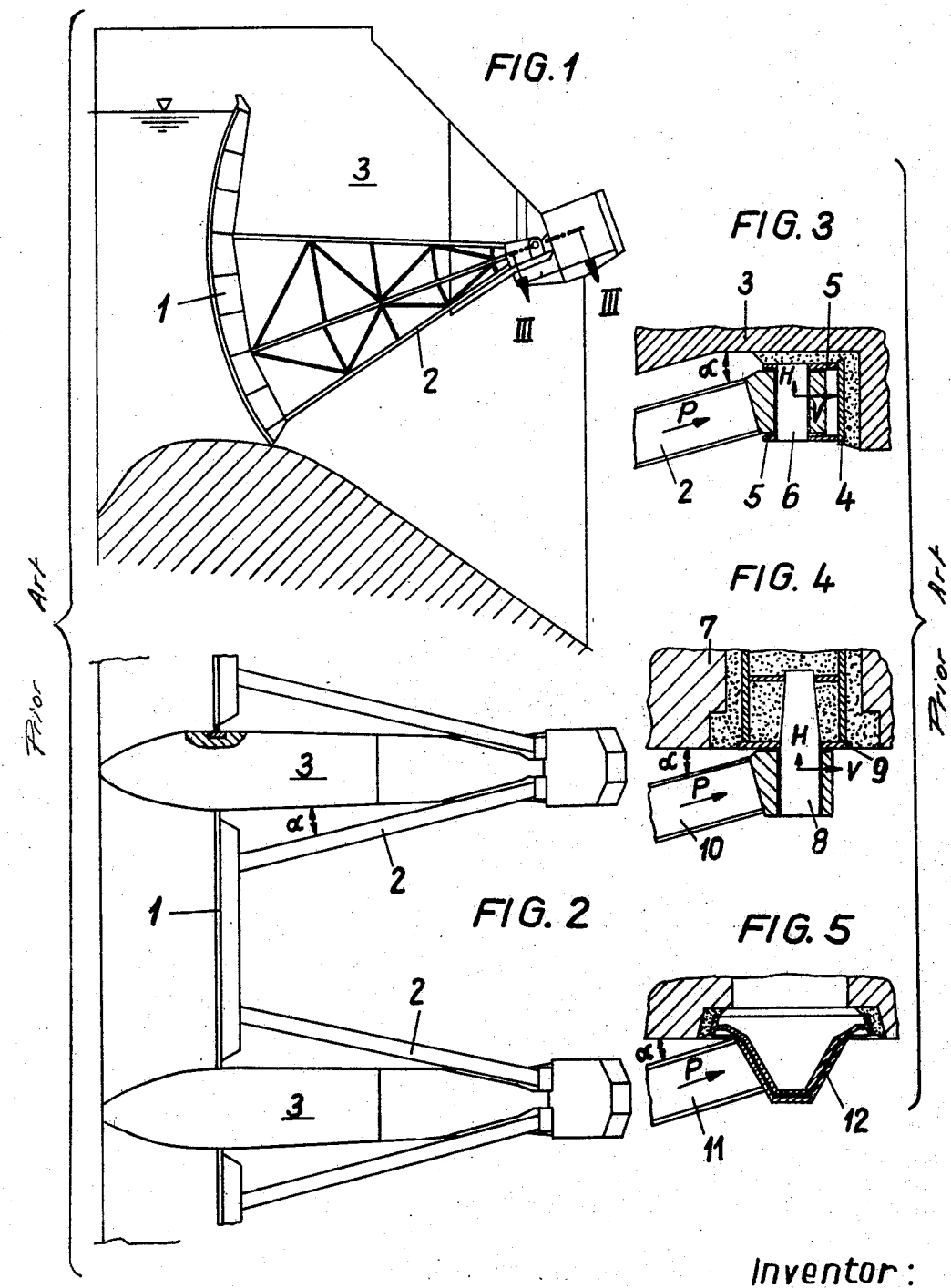

United States Patent Office 3,505,822
Patented Apr. 14, 1970

3,505,822
PIVOT BEARING FOR SEGMENTAL GATES
Hans Schulz, Rheinhausen (Lower Rhine), Germany, assignor to Fried. Krupp Gesellschaft mit beschrankter Haftung, Essen, Germany
Filed May 17, 1968, Ser. No. 730,092
Claims priority, application Germany, May 19, 1967, 1,634,018
Int. Cl. E02b 7/40, 7/42
U.S. Cl. 61—25                 5 Claims

ABSTRACT OF THE DISCLOSURE

A pivot bearing for segmental gates, in which the supporting arms of said gates are arranged at an acute angle with regard to the flanks of the piers while the bearing base plate is substantially perpendicular with regard to the respective supporting arm pertaining thereto.

---

The present invention relates to pivot bearings for segmental gates the supporting arms of which are arranged at an angle or certain inclination with regard to the flanks of piers and in which the pivot axis is parallel to the segmental weir dam.

With the heretofore known pivot bearings of the above mentioned general type, the bearing base plate is perpendicular and its side walls which support the shaft of the pivot bearing extend parallel to the flanks of the pier.

With another heretofore known pivot bearing, the laterally protruding bearing stud is supported in a construction which is likewise parallel to the flanks of the pier. These heretofore known pivot bearings require a very careful combination of the steel ingredients with the concrete by pouring beneath the base plate and the side walls in order to be sure that the occurring forces can be properly transferred. Furthermore, in case the piers are offset, necessary corrections of the pivot bearings are extremely difficult. The last mentioned type of pivot bearing is furthermore relatively heavy and expensive, whereas the first mentioned pivot bearing construction which heretofore was predominantly used is sensitive against soiling and icing so that in this case frequently cover structures became necessary.

There has furthermore become known a pivot bearing according to which the occurring force is conveyed through a truncated cone-shaped plate. This pivot bearing is relatively expensive. Later corrections which might become necessary are likewise very difficult.

It is, therefore, an object of the present invention to provide a pivot bearing construction for segmental gates, which will overcome the above mentioned drawbacks.

It is another object of this invention to provide a pivot bearing construction for segmental gates in which any displacement or turning of the pivot bearing can be realized by a simple variation in intermediate layers employed in this connection.

These and other objects and advantages of the invention will appear more clearly from the following specification in connection with the accompanying drawings, in which:

FIG. 1 diagrammatically illustrates a side view of a segmental gate.

FIG. 2 is a top view of the gate of FIG. 1.

FIG. 3 represents a longitudinal section through a heretofore known pivot bearing along the line III—III of FIG. 1 but on a larger scale than the latter.

FIGS. 4 and 5 respectively illustrate longitudinal sections through modified pivot bearings also of known constructions.

Figure 6:
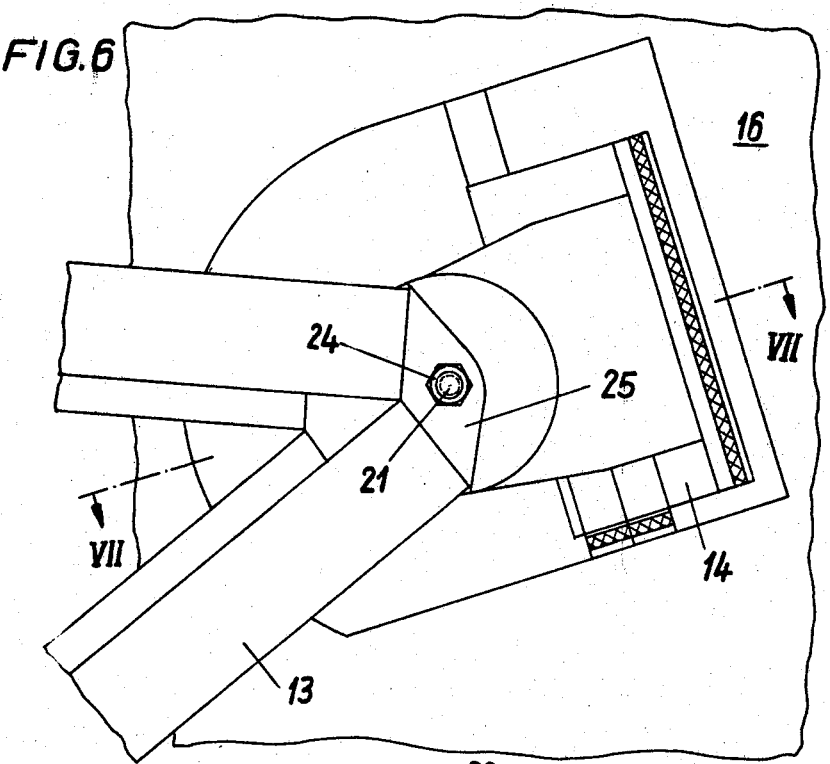

FIG. 6 is a diagrammatic side view of a pivot bearing according to the invention.

Figure 7:
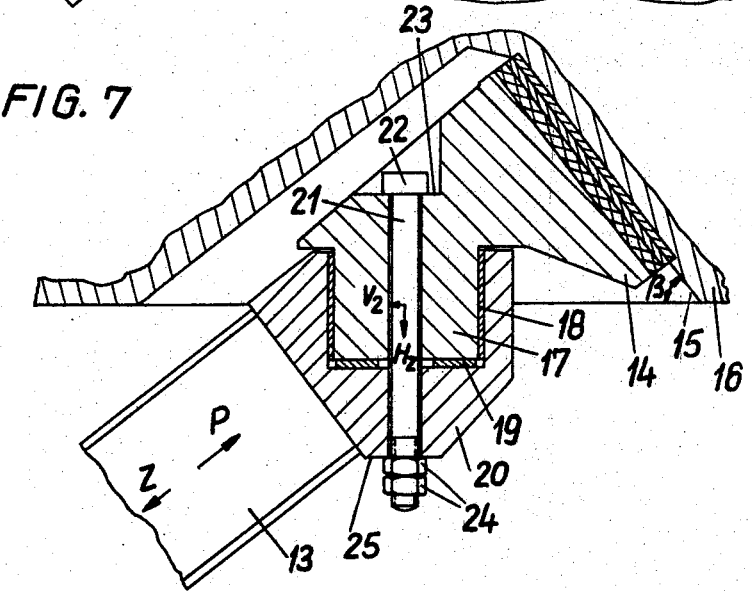

FIG. 7 illustrates a section taken along the line VII—VII of FIG. 6.

A pivot bearing for segmental gates the supporting arms of which are inclined at a certain angle with regard to the flanks of the pier and in which the pivot axis is parallel to the dam of the segmental gate is, in conformity with the present invention, characterized primarily in that the bearing base plate forms a right angle with regard to the respective supporting arm. The force occurring with such a construction is directed perpendicularly against the bearing base plate so that only one surface is necessary for the power transfer into the pier. Advantageously, the bearing base plate and the bearing stud form a unit.

According to a further feature of the invention, the bearing stud which, for instance, may be provided with outer layers of bronze or synthetic material, as for instance, nylon, is surrounded on all sides by a sleeve. In this way the pivot bearing is non-sensitive to soil and ice inasmuch as it is no longer possible that metal pieces, rocks, or ice may cause jamming.

According to a further development of the present invention, a tie rod is concentrically arranged with regard to the bearing stud which tie rod extends through the bearing stud and the sleeve and has one end provided with a head resting against the outer surface of the bearing stud whereas its other end has threaded thereon nuts by means of which the tie rod rests against the outer surface of the sleeve. In this way also a limited absorption of pulling forces will be possible.

Referring now to the drawings in detail, with the segmental gate 1 shown in FIGS. 1 and 2, the supporting arms 2 form an angle α with the flanks of the pier 3. The base plate 4 of the pivot bearing shown in FIG. 3 is perpendicular and the side walls 5 are parallel to the flanks of the pier 3 while the bearing stud 6 supported by the side walls 5 protrudes perpendicularly from the pier 3. Due to the fact that the supporting arms 2 form an angle α with the flanks of the pier 3, the force P acting in the direction of the supporting arm 2 is split up into a component H parallel and into a component V perpendicular to the bearing base plate 4 which latter component is conveyed through bearing stud 6 and side walls 5 to the bearing base plate 4. The bearing stud 8 pertaining to the pivot bearing of FIG. 4 and protruding laterally from the pier 7 is supported by a construction 9 which is likewise parallel to the flanks of the pier 7. Also in this instance, the force P which acts in the direction of the supporting arm 10 forming an angle α with the flanks of pier 7 is split up into two components H and V, which are conveyed into the pier in different manners.

FIG. 5 illustrates a pivot bearing according to which the force P which acts in the direction of the supporting arm 11 is conveyed through a truncated cone-shaped structure or dish 12.

The pivot bearing according to the invention and shown in FIGS. 6 and 7 has a bearing plate 14 which extends at a right angle with regard to the direction of extension of the supporting arm 13. As a result thereof, th force P acting in the direction of the supporting arm 13 is directed perpendicularly toward the bearing base plate 14 so that the force P will not be split up into components. The introduction of the force P into a surface 15 of the pier 16 which surface 15 together with the bearing base plate 14 forms an angle β (angle β being less than 90°) with the flanks of the pier 16 results in a more favorable stress of the concrete below the pivot bearing than the introduction of a component into a surface which is rectangular with regard to the flanks of the pier. The bearing stud 17 which forms a single piece with the bearing base plate 14 and which is covered with outer layers 18 and 19 of bronze or nylon is surrounded on all sides by a sleeve 20. Sleeve 20 has connected thereto the supporting arm 13. A tie rod 21 is concentrically arranged with regard to the bearing stud 17 and extends through the bearing stud 17 and the sleeve 20. The tie rod 21 is equipped with a head 22 by means of which it rests against the outer surface 23 of the bearing stud 17. The other end of the tie rod 21 is provided with thread receiving nuts 24 by means of which the tie rod 21 rests against the outer surface 25 of sleeve 20. In this way, the tie rod 21 is able to absorb the axial components $H_z$ resulting from a possibly occurring pulling force Z, whereas its component $V_z$ perpendicular thereto is conveyed away through the bearing stud 17 and the bearing base plate 14.

It is, of course, to be understood that the present invention is, by no means, limited to the particular constructions shown in the drawings but also comprises any modifications within the scope of the invention.

What I claim is:

1. In combination in a gate construction having piers each with a flank, a segmental gate including supporting arm means and being movable from a closed position to an open position and vice versa, pivot means pivotally supporting said gate, and bearing base plate means forming a unit with said pivot means and having a surface in engagement with a respective parallel surface of the adjacent pier for resting said unit against said pier, said surfaces in engagement with each other being arranged substantially perpendicularly with regard to the longitudinal axis of the respective adjacent supporting arm means when said segmental gate is in closed position, said segmental gate including said supporting arm means defining an inclined angle with the flank of the respective adjacent piers so that force which acts in the direction of said supporting arm means is split up into two components being conveyed into the respective piers in differing manner including a first component of force parallel to said bearing base plate means and a second component of force perpendicular to said bearing base plate means.

2. An arrangement further in combination according to claim 1, in which said bearing base plate means and said pivot means form an integral unit with each other, and with said pivot means there being a bearing stud as well as side wall means through which said second component of force is conveyed to said bearing base plate means.

3. In combination in a gate construction having piers, a segmental gate including supporting arm means defining an acute angle with the flank of the respective adjacent piers and being movable from a closed position to an open position and vice versa, pivot means pivotally supporting said gate, and bearing base plate means forming a unit with said pivot means and having a surface in engagement with a respective parallel surface of the adjacent pier for resting said unit against said pier, said surfaces in engagement with each other being arranged substantially perpendicularly with regard to the longitudinal axis of the respective adjacent supporting arm means when said segmental gate is in closed position, a layer of bronze covering the outside of said pivot means, and sleeve means surrounding and slidably engaging said bronze covered pivot means.

4. In combination in a gate construction having piers, a segmental gate including supporting arm means defining an acute angle with the flank of the respective adjacent piers and being movable from a closed position to an open position and vice versa, pivot means pivotally supporting said gate, and bearing base plate means forming a unit with said pivot means and having a surface in engagement with a respective parallel surface of the jacent pier for resting said unit against said pier, said surfaces in engagement with each other being arranged substantially perpendicularly with regard to the longitudinal axis of the respective adjacent supporting arm means when said segmental gate is in closed position, a layer of synthetic material covering the outside of said pivot means, and sleeve means surrounding and slidably engaging said synthetic material covered pivot means.

5. In combination in a gate construction having piers, a segmental gate including supporting arm means defining an acute angle with the flank of the respective adjacent piers and being movable from a closed position to an open position and vice versa, pivot means pivotally supporting said gate, and bearing base plate means forming a unit with said pivot means and having a surface in engagement with a respective parallel surface of the adjacent pier for resting said unit against said pier, said surfaces in engagement with each other being arranged substantially perpendicularly with regard to the longitudinal axis of the respective adjacent supporting arm means when said segmental gate is in closed position, sleeve means rotatably receiving said pivot means, a tie rod coaxially arranged with regard to said pivot means and extending through said pivot means and said sleeve means, one end of said tie rod being provided with a head and resting against the outer surface of said pivot means, and nut means threadedly engaging the other end of said tie rod and resting against said sleeve means.

References Cited

UNITED STATES PATENTS

| 1,506,230 | 8/1924 | Fargo | 61—25 |
| 2,705,871 | 4/1955 | Kenigsberg | 61—25 |
| 3,336,756 | 8/1967 | Isenberg et al. | 61—25 |

FOREIGN PATENTS

| 649,746 | 10/1962 | Canada. | |

PETER M. CAUN, Primary Examiner